United States Patent

[11] 3,604,121

| [72] | Inventor | Harold R. Hull |
| | | San Leandro, Calif. |
| [21] | Appl. No. | 735,282 |
| [22] | Filed | June 7, 1968 |
| [45] | Patented | Sept. 14, 1971 |
| [73] | Assignee | Hexcel Corporation |
| | | Dublin, Calif. |

[54] ROLL ALIGNMENT METHOD AND APPARATUS
10 Claims, 4 Drawing Figs.

[52] U.S. Cl. .................................................. 33/182,
33/46 AT, 33/84, 33/204 R, 74/5.22
[51] Int. Cl. ........................................... G01b 5/24,
G01c 19/24
[50] Field of Search........................................... 33/182, 84,
46.2, 72 G, 204, 204.2, 226; 74/5.22; 356/153

[56] References Cited
UNITED STATES PATENTS

| 22,598 | 1/1859 | Windle .................... | 33/73 D UX |
| 2,273,876 | 2/1942 | Lutz et al. ................ | 33/204.2 X |
| 2,636,273 | 4/1953 | Morris ..................... | 33/84 X |
| 2,681,576 | 6/1954 | Glass et al. ............... | 33/204 X |
| 2,796,673 | 6/1957 | Wells ....................... | 33/84 X |
| 3,001,290 | 9/1961 | Rellensmann et al. ...... | 33/226 UX |
| 3,253,472 | 5/1966 | Klemes ..................... | 33/204 X |
| 3,283,408 | 11/1966 | Rothe et al. .............. | 33/72 G |

FOREIGN PATENTS

| 1,322,262 | 2/1963 | France .................... | 74/5.22 |
| 930,657 | 7/1955 | Germany................... | 33/204 |
| 274,980 | 8/1927 | Great Britain............. | 33/204 (.2) |
| 869,627 | 5/1961 | Great Britain............. | 356/153 |
| 1,100,524 | 1/1968 | Great Britain............. | 33/72 G |

Primary Examiner—Robert B. Hull
Attorney—Townsend and Townsend

ABSTRACT: A roll alignment method and apparatus having a platform adapted for sequential placement on a plurality of rollers to be made codirectional in which a gyro-controlled optical reflective device is gyro-stabilized on the platform with reference to the first of the rollers so that the platform can be moved to subsequent rollers for alignment of the subsequent rollers with the gyro reference.

PATENTED SEP 14 1971 3,604,121
SHEET 1 OF 2
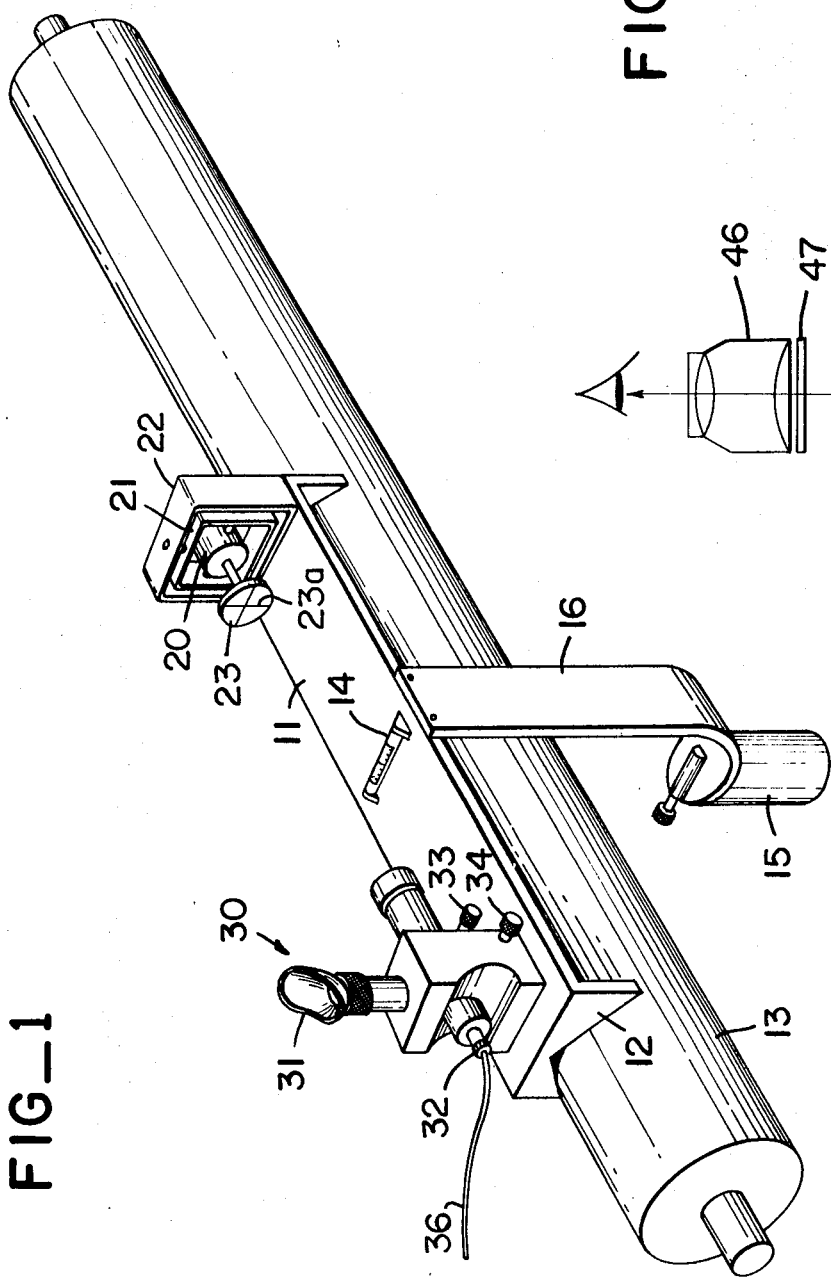
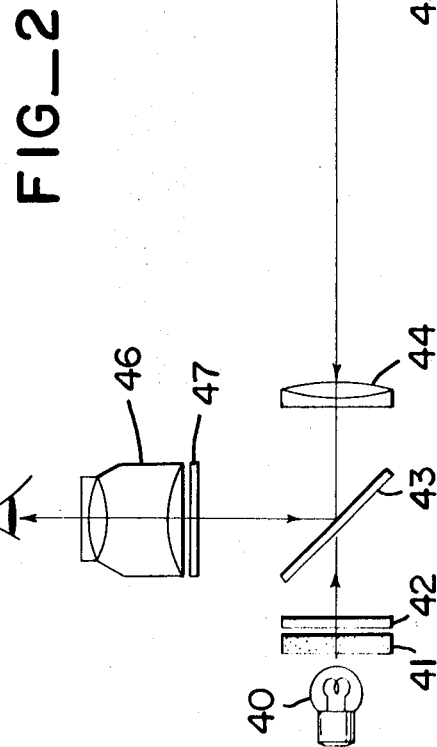
INVENTOR.
HAROLD R. HULL
BY
Townsend and Townsend
ATTORNEYS

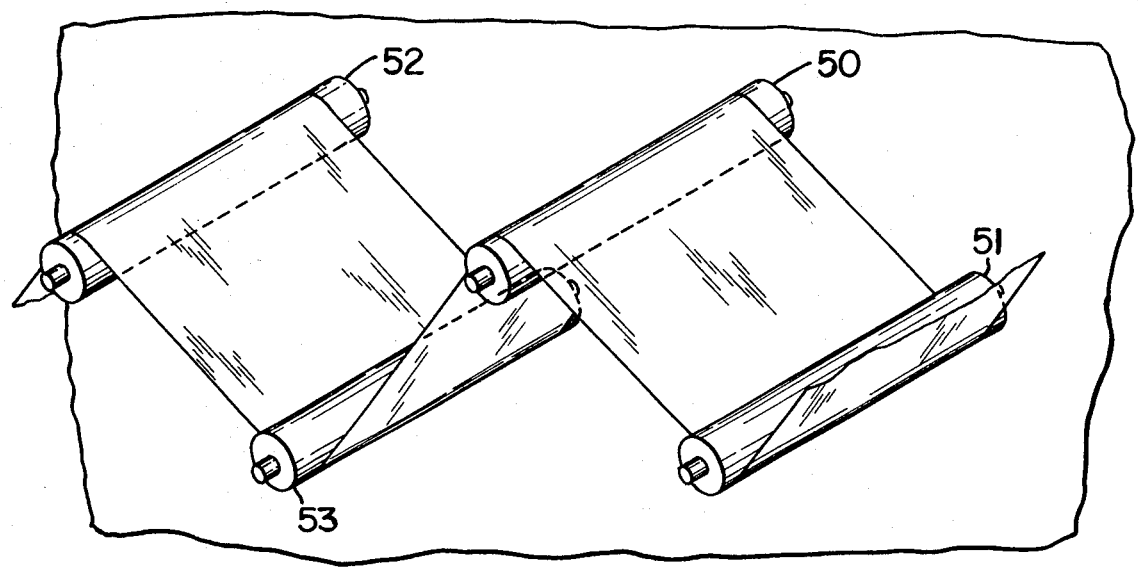
FIG_4
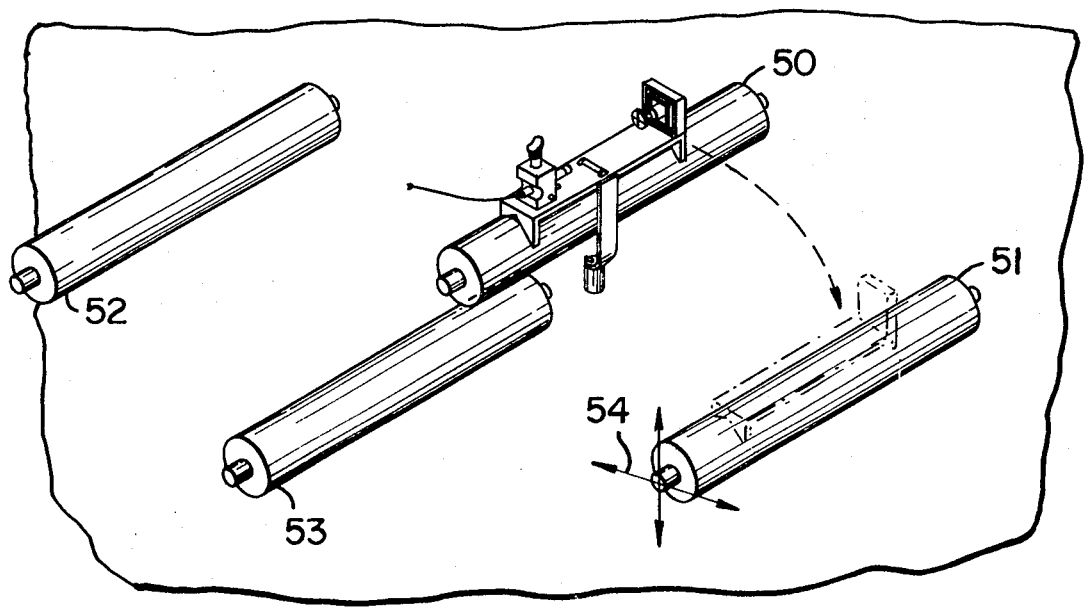
FIG_3

ROLL ALIGNMENT METHOD AND APPARATUS

This invention relates to a new and improved roll alignment method and apparatus for accurately aligning rolls and processing equipment in sheet-processing systems.

In continuation web processing, very often large sheets of foil, such as aluminum, are passed over a plurality of rollers. If any one of the rollers is not in parallel with the others the tracking of the web is frustrated. The present invention involves a simple method and apparatus whereby the rollers of a web processing line can be accurately oriented with reference to each other to prevent the aforesaid problem.

In order to accomplish this result the present invention contemplates providing an elongated base having a gyroscope and housing therefor mounted at one end of the elongated base. A reference plane mirror is mounted on the housing of the gyroscope. An optical system is mounted at the other end of the elongated base for viewing the reference plane mirror and determining alignment and orientation of the optical system with respect to the reference plane mirror. According to one embodiment, the optical system comprises an autocollimator.

According to the invention, the elongated base with the gyroscope and optical system mounted thereon is positioned on a first roller and the optical system is oriented with respect to the reference plane mirror to a zero point. Zero alignment may be accomplished by adjustment of either the optics or the gyro. The alignment device is then positioned on a second roller and the reference plane mirror viewed through the optical system. The second roller is then adjusted until the optical system and reference plane mirror are again at zero orientation. The rollers are then each in accurate alignment, with respective axial azimuths of the rollers parallel to each other. The alignment device is sequentially positioned on each of the rollers to be aligned and the rollers adjusted for alignment of the optical system and gyro. Zero alignment may be checked by returning the device to the first or reference roller and resetting the alignment of the optical system and gyro if necessary.

A feature and advantage of the method of alignment described above is that the rollers are with made codirectional reference to each other and not with reference to the supporting machinery or gravity so that the axial azimuths of the rollers are parallel.

Other objects, features and advantages of the present invention will become apparent in the following specification and accompanying drawings.

IN THE DRAWINGS

FIG. 1 is a perspective view of a roll alignment device embodying the present invention.

FIG. 2 is a diagrammatic view of an alternative optical system for use in the roll alignment device illustrated in FIG. 1.

FIG. 3 is a perspective view of a plurality of rollers being aligned according to the method of the present invention.

FIG. 4 is a perspective view of a portion of a sheet or web-processing system.

In the embodiment of the present invention illustrated in FIG. 1 there is provided an elongated base 11 provided with V-block feet 12 for positioning the base on a roller 13 which forms part of a sheet-processing system. Positioned on the elongated base 11 transversely across the longitudinal axis of the base is a level 14 for accurately positioning the base 11 on roller 13. The base 11 may also be provided with a counterbalance weight 15 connected to one side of the base 11 by the connector strip 16 to further stabilize the base 11 on roller 13 and facilitate leveling the base 11 in the direction of level 14.

At one end of the elongated base 11 a gyroscope 20 including a drive motor and flywheel in a suitable housing is mounted for rotation in two planes on gimbals 21 and 22. The gyroscope is thus free to move in two mutually orthogonal planes, both normally orthogonal to the axis of the spin of the flywheel of gyroscope 20. Mounted on the gyroscope housing and facing in the direction of the opposite end of the elongated base 11 is a reference plane mirror 23 adapted to move with the gyroscope housing.

Mounted at the opposite end of elongated base 11 is an optical system 30, rigidly fixed to the base 11 for viewing the reference plane mirror 23 and determining the orientation of the mirror and gyroscope 20 with respect to an optical axis of the optical system 30. The optical system includes an eyepiece 31, light source 32, and controls 33 and 34 for adjusting the optical system. Power for the light source and gyro motor is obtained through a power line 36.

One optical system suitable for use in the present invention is an autocollimator as illustrated in FIG. 2. The optical system comprises a light source 40 and translucent screen 41 such as a frosted glass screen for diffusing light from the source 40. The light source illuminates a reticle 42 such as cross hairs and the resulting light is transmitted by beam splitter 43 to the collimating lens 44 which directs substantially parallel light at the reference plane mirror 45 fixed to the gyroscope. The collimated light reflected back by reference plane mirror 45 is focused by the collimating lens 44 and reflected by beam splitter 43 towards an eyepiece lens 44 and reflected by beam splitter 43 towards an eyepiece lens 46. Positioned in the focal plane of eyepiece 46 is a comparison reticle 47 such as cross hairs for comparing the relative position of the reflected image of reticle 42. When the reference plane mirror 45 is perpendicular to the horizontal optical axis of the autocollimator, the reflected image of reticle 42 and comparison reticle 47 can be set for zero alignment.

Instead of the autocollimator, cross hairs may be formed directly on the reference mirror 23 for viewing through a lens system and for comparison with a reticle at the eyepiece. The sensitivity of this optical system in detecting displacement is only half that of the autocollimator because in the latter the projected reticle image travels twice the distance between the optics and the reference mirror 23.

In using the device, the elongated base is positioned on a first roller 50, as illustrated in FIG. 3, which is to serve as a reference for alignment of subsequent rollers 51—53 which form part of the sheet or web processing system illustrated in FIG. 4. The reference plane mirror 23 is then viewed through eyepiece 31 and the comparison cross hairs set in zero alignment by means of controls 33 and 34. Zero alignment may be achieved by adjusting elements of the optical system or by adjusting the gyroscope and reference plane mirror. The device is then positioned on a subsequent roller 51 and the reference mirror 23 again viewed through eyepiece 31 to determine the change in position with respect to the comparison cross hairs. If there is no longer zero alignment between the reflected image of the cross hair or reticle 42 and the comparison cross hair or comparison reticle 47, the orientation of the roller may be adjusted as indicated by the arrows 54 until the cross hairs in the optical system are once again in alignment. The axial azimuths of the rollers are then also in parallel alignment. In order to check the orientation of the gyroscope, the device may again be returned to the original roller and the reference mirror 23 viewed through eyepiece 31. The rollers are thus aligned with respect to each other without reference to the supporting machinery for the rollers. Instead of the autocollimator described above, any optical system suitable for determining alignment could be used.

It is apparent that the present invention is useful for determining parallel alignment of processing equipment and elongated members generally.

Although only one embodiment of the present invention has been shown and described, other adaptations and modifications would be apparent without departing from the true spirit and scope of the following claims.

What is claimed is:

1. A gyroscopic alignment device comprising: an elongated base having V-block feet for positioning said base on an elongated cylindrical member; a gyroscope and housing therefor mounted for free movement at one end of the elongated base;

a reference plane mirror mounted on the housing of said gyroscope adapted to move with said gyroscope and housing; an optical system mounted at the other end of said elongated base for determining alignment of the reference plane mirror with respect to the optical system, and means for aligning said optical system and reference plane mirror relative to each other.

2. A gyroscope alignment device as set forth in claim 1 wherein said optical system comprises an autocollimator.

3. A gyroscopic alignment device as set forth in claim 2 wherein said autocollimator comprises: an eyepiece; a comparison reticle in the focal plane of said eyepiece; and a beamsplitter for providing an optical path between said eyepiece and said reference plane mirror.

4. A gyroscopic alignment device as set forth in claim 3 wherein said autocollimator further comprises: a light source on the side of the beamsplitter opposite said eyepiece; a reticle spaced from said light source; and a collimating lens positioned between the beamsplitter and the reference plane mirror.

5. A gyroscopic alignment device as set forth in claim 1 wherein a reticle is formed on the reference plane mirror and the optical system comprises an eyepiece for viewing the reference plane mirror and a comparison reticle.

6. A gyroscopic alignment device as set forth in claim 5 wherein there is provided level indicating means mounted on said elongated base oriented in a direction transverse to the longitudinal axis of the elongated base.

7. A gyroscopic alignment device as set forth in claim 6 wherein there is also provided balancing weight means depending from said elongated base.

8. A gyroscopic alignment device as set forth in claim 1 wherein said gyroscope and housing are mounted on said elongated base for rotation about two orthogonal axes, said axes being mutually orthogonal to the axis of spin of the flywheel of said gyroscope.

9. A gyroscopic alignment device comprising: an elongated base having at least one V-shaped groove formed along the bottom thereof for placement of the base on an elongate cylindrical member; a gyroscope and housing therefor mounted for free movement at one end of the elongated base; a reference plane mirror mounted on the housing of said gyroscope adapted to move with said gyroscope and housing; an optical system mounted at the other end of said elongated base for viewing said reference plane mirror comprising; eyepiece lens means; means providing an optical path between said eyepiece lens means and said reference plane mirror; comparison reticle means interposed in the optical path between said eyepiece lens means and said reference plane mirror for indicating alignment between said optical system and said reference plane mirror.

10. A gyroscopic alignment device as set forth in claim 9 wherein said means providing an optical path between said eyepiece lens means and said reference plane mirror comprises a beamsplitter and a collimating lens and said comparison reticle means comprises cross hairs interposed in the focal plane of said eyepiece lens means.